United States Patent
Belser et al.

(10) Patent No.: US 6,253,010 B1
(45) Date of Patent: Jun. 26, 2001

(54) SYSTEM AND METHOD FOR EFFICIENT COUPLING BETWEEN OPTICAL ELEMENTS

(75) Inventors: Karl A. Belser, San Jose; Gabor G. Szita, Santa Clara; Howard S. Lee, San Jose, all of CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/190,429

(22) Filed: Nov. 12, 1998

Related U.S. Application Data

(60) Provisional application No. 60/082,097, filed on Apr. 17, 1998.

(51) Int. Cl.[7] .................. G02B 6/26; G02B 6/35
(52) U.S. Cl. .................. 385/52; 385/16; 356/400
(58) Field of Search .................. 385/52, 90, 16; 356/73.1, 123, 399, 400; 250/201.2, 201.4, 201.5, 227.24

(56) References Cited

U.S. PATENT DOCUMENTS

| | | | |
|---|---|---|---|
| 4,545,643 | * 10/1985 | Young et al. | 385/78 |
| 4,696,062 | 9/1987 | LaBudde | 455/612 |
| 4,770,529 | * 9/1988 | Levinson et al. | 356/153 |
| 4,884,015 | * 11/1989 | Sugimoto et al. | 318/640 |
| 4,946,246 | * 8/1990 | Shiga | 385/52 |
| 5,029,965 | * 7/1991 | Tan | 385/90 |
| 5,087,109 | * 2/1992 | Ishizuka et al. | 385/34 |
| 5,096,301 | * 3/1992 | Stanley | 356/73.1 |
| 5,463,215 | * 10/1995 | Alfille | 250/206.1 |
| 5,623,337 | * 4/1997 | Iori et al. | 356/153 |

FOREIGN PATENT DOCUMENTS

| | | | |
|---|---|---|---|
| 0432912A2 | 6/1991 | (EP) | B23K/26/02 |
| 55-15107 | * 2/1980 | (JP) . | |
| WO98/09286 | 3/1998 | (WO) | G11B/11/10 |

* cited by examiner

*Primary Examiner*—Rodney Bovernick
*Assistant Examiner*—Michael J. Stehl
(74) *Attorney, Agent, or Firm*—Flehr Hohbach Test Albritton & Herbert LLP

(57) ABSTRACT

A system and method for efficient coupling between optical elements comprises a memory containing an alignment module configured to align a light beam with an optical element to maximize coupling efficiency, and a processor coupled to the memory to control the alignment module. A position sensitive device indirectly senses a position of the light beam on the optical element and sends the position to the processor. The alignment module directly measures coupling efficiency where the light beam contacts the optical element. The alignment module identifies a direction of increasing coupling efficiency and aligns the light beam with the optical element along that direction until maximum coupling efficiency is achieved.

39 Claims, 9 Drawing Sheets

SYSTEM AND METHOD FOR EFFICIENT COUPLING BETWEEN OPTICAL ELEMENTS

CROSS-REFERENCE TO RELATED APPLICATION

This application claims the benefit of Provisional Application Ser. No. 60/082,097, entitled "Measurement of Alignment Error in a Free-Space-Beam to a Fiber Coupler," filed on Apr. 17, 1998. The subject matter of this related application is incorporated herein by reference. The related applications are commonly assigned.

BACKGROUND OF THE INVENTION

1. Field of the Invention

This invention relates generally to optical systems, and relates more particularly to a system and method for efficient coupling between optical elements.

2. Description of the Background Art

Implementing techniques for efficient coupling between optical elements is a significant consideration of designers, manufacturers, and users of optical systems. Many modern optical systems use light beams, usually laser-generated, to carry various types of information. These light beams may travel through free space or through optical elements such as optical fibers. In optical systems, a light beam may alternate between travelling in free space and travelling in a fiber. This free-space-to-fiber coupling often occurs in the context of an optical switch.

Free-space-to-fiber coupling should be efficient to avoid unnecessary losses in light. Coupling efficiency is especially important in optical systems where light beams are sent through a fiber and then reflected back. If the free-space-to-fiber coupling is not efficient, then the amount of light reflected back through the fiber might be insufficient for its intended purpose.

For efficient coupling, a light beam travelling through free space must contact a fiber so that the amount of light transmitted through the fiber is maximized. The most efficient coupling between a free space beam and a fiber occurs when the light beam is centrally positioned on the core of the fiber (on the fiber center). This central positioning results in the maximum amount of light being transmitted through the fiber.

However, once positioned on the fiber center, the light beam may not remain in place. If the optical system suffers a shock or vibration, the physical components of the optical system may shift, causing the light beam to be offset from the fiber center.

Other factors may also cause the light beam to be offset from the fiber center. For example, thermal expansion of a fiber may cause it to shift, reducing the coupling efficiency between the light beam and the fiber. This type of offset poses a different problem from offset due to movements of the physical components of the optical system. A system and method for efficient coupling must be able to correct offsets due to vibration, thermal expansion, and any other cause. Therefore, an improved system and method are needed for efficient coupling between optical elements.

SUMMARY OF THE INVENTION

In accordance with the present invention, a system and method are disclosed to effectively implement efficient coupling between optical elements. The preferred embodiment of the present invention is implemented in the context of an optical switch. In the optical switch, a light beam couples with a selected optical fiber in a fiber bundle. Efficient coupling occurs when the light beam is positioned on the center of the selected fiber.

In the preferred embodiment of the present invention, a memory contains an alignment module, which is configured to align the light beam with the center of the selected fiber to maximize coupling efficiency. The preferred embodiment of the present invention also includes a processor coupled to the memory to control the alignment module, and a position sensitive device for indirectly sensing a position of the light beam on the selected fiber and sending the position to the processor.

The alignment module includes three main components. The first component, a center estimator, estimates the position of the center of a selected optical fiber in the optical switch. The estimate position for the center of the fiber is determined by using an offset in fiber position due to a temperature change in the optical system.

The second component, a center searcher, positions the light beam on the center of the selected fiber. The center searcher identifies a direction of increasing coupling efficiency and moves the light beam along that direction until the beam is positioned on the fiber center. The third component, a center maintainer, maintains the light beam on the fiber center as long as the same fiber in the fiber bundle is selected. The center maintainer continuously assesses coupling efficiency near the fiber center and repositions the light beam if an increase in coupling efficiency is found.

If a different fiber in the fiber bundle is selected, the alignment module determines an estimate position for the fiber center of the new fiber using the same offset in position used for the initially selected fiber. The alignment module then positions the beam on the center of the new fiber. Therefore, the system and method of the present invention effectively implements efficient coupling between optical elements.

DETAILED DESCRIPTION OF THE PREFERRED EMBODIMENT

The present invention relates to an improvement in coupling efficiency between optical elements. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for efficient coupling between optical elements. The invention includes a memory containing an alignment module configured to align a light beam with an optical element to maximize coupling efficiency, and a processor coupled to the memory to control the alignment module. The invention also includes a position sensitive device for indirectly sensing a position of the light beam on the optical element. The alignment module directly measures coupling efficiency where the light beam contacts the optical element. The alignment module identifies a direction of increasing coupling efficiency and aligns the light beam with the optical element along that direction until maximum coupling efficiency is achieved.

Figure 1:
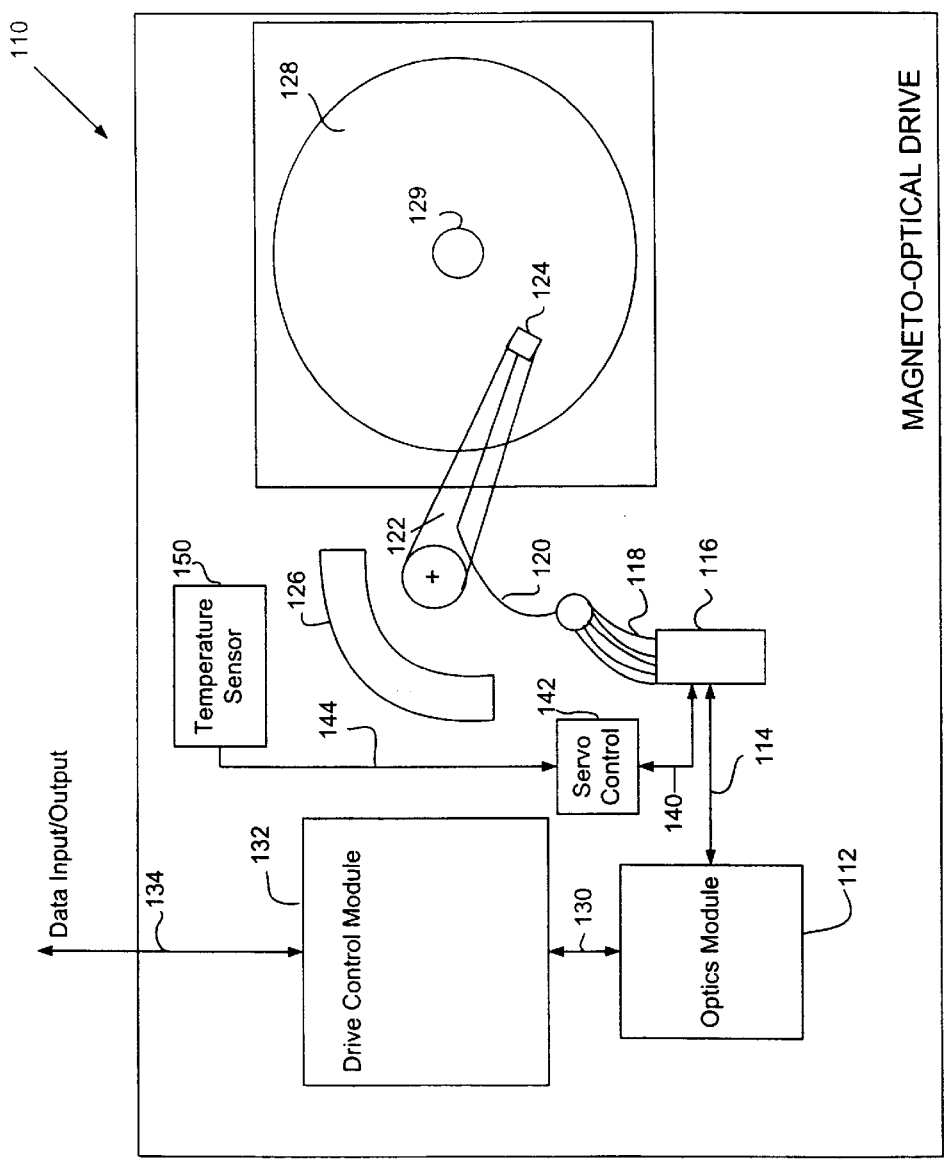
FIG. 1 is a pictorial view of one embodiment of a magneto-optical drive, according to the present invention.

Referring now to FIG. 1, a pictorial view of one embodiment of a magneto-optical drive 110 is shown. Although a magneto-optical drive is discussed here, other types of optical systems, for example an optical drive, are within the scope of the present invention. Magneto-optical drive 110 preferably uses laser-generated light beams to carry information. In the FIG. 1 embodiment, magneto-optical drive 110 includes an optics module 112, an optical pathway 114, an optical switch 116, a fiber bundle 118, an actuator magnet and coil 126, a plurality of head arms 122, a plurality of magneto-optical heads 124, a plurality of magneto-optical storage media 128, a drive control module 132, a servo control 142, and a temperature sensor 150.

Each of the plurality of magneto-optical storage media 128 are mounted on a spindle 129 for continuous rotation at a constant angular velocity, and each of the plurality of magneto-optical heads 124 is preferably attached via a head arm 122 to electromagnetic actuator magnet and coil 126.

In the FIG. 1 embodiment, optical switch 116 receives light through optical pathway 114 and routes the light to one of a plurality of fibers in fiber bundle 118. The switching properties of optical switch 116 are bi-directional, so that light reflected back to the switch 116 from storage media 128 along one of the fibers in fiber bundle 118 may also be routed to optical pathway 114. Each fiber of fiber bundle 118 is preferably routed along a respective head arm 122 to a respective magneto-optical head 124 and storage media 128.

A reflected light signal from storage media 128 couples back through magneto-optical head 124, one of the fibers in fiber bundle 118, optical switch 116, and reaches optics module 112 via optical pathway 114. Optics module 112 then converts the light signal to an electronic signal, which is then transmitted to drive control module 132 via data pathway 130. Drive control module 132 communicates the data represented by the electronic signal to a computer (not shown) via data input/output 134.

Figure 2:
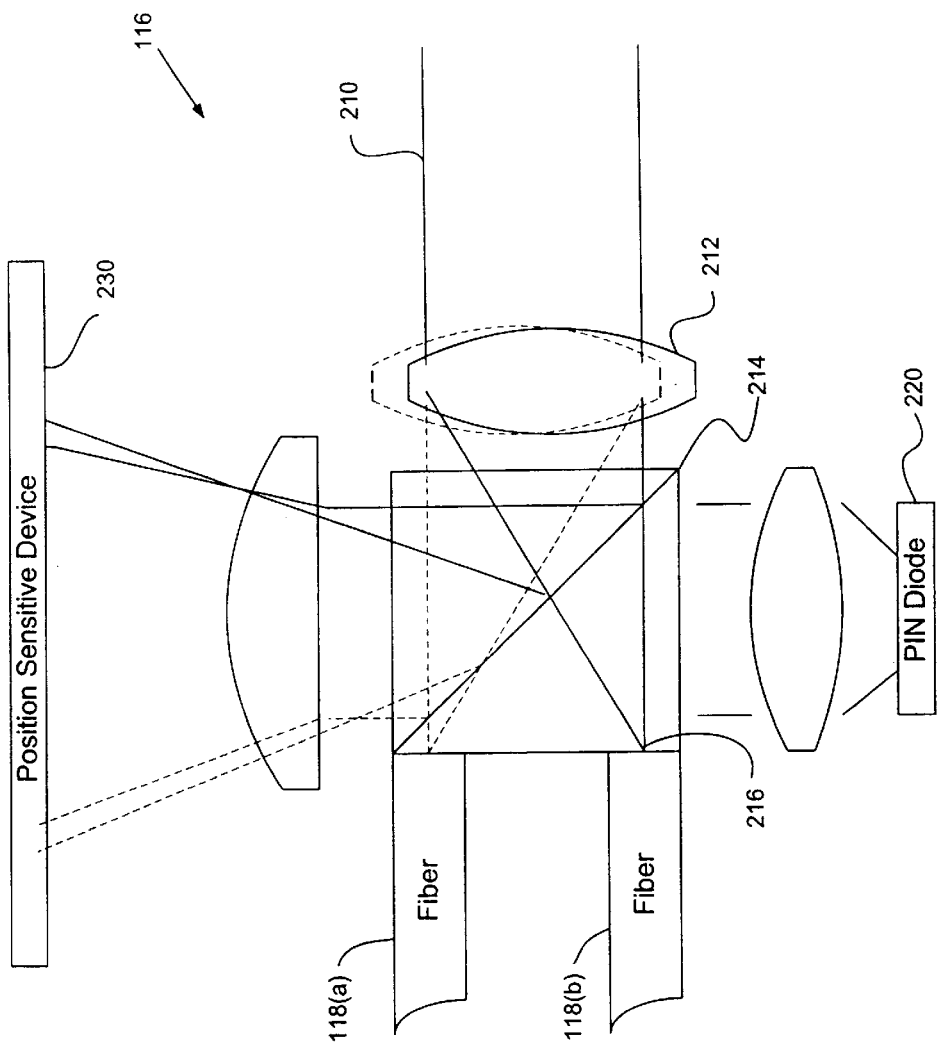
FIG. 2 is a pictorial view of one embodiment of the optical switch of FIG. 1, according to the present invention.

Referring now to FIG. 2, a pictorial view of one embodiment of optical switch 116 is shown. In operation, light preferably enters switch 116 as a collimated laser beam 210, which travels from optics module 112 through optical pathway 114 (FIG. 1). Beam 210 then passes through a beam positioner 212, which preferably focuses beam 210 on a selected fiber 118(b) at a focus point 216. In the FIG. 2 embodiment of switch 116, beam positioner 212 comprises a movable lens, which moves in both the x- and y-directions to focus beam 210 on a particular fiber 118(b) in fiber bundle 118. Those skilled in the art will recognize that in other embodiments of optical switch 116, beam positioner 212 may comprise devices other than a movable lens. For example, a pivoting mirror may be used to direct beam 210 through a Gradient Refractive Index (GRIN) lens to position focus point 216 on fiber 118(b).

Beam 210 then travels through fiber 118(b), along the fiber's respective head arm 122, to the fiber's respective magneto-optical head 124. Head 124 then directs beam 210 onto storage media 128. Beam 210 is reflected back from storage media 128 to head 124, and travels back to optical switch 116 through fiber 118(b).

A PIN diode 220 (or an equivalent device) advantageously measures the amount of light reflected back through fiber 118(b) from storage media 128 at focus point 216. Ideally, focus point 216 is positioned on fiber 118(b) such that the amount of light reflected back through fiber 118(b) from storage media 128 is maximized. The most efficient coupling occurs when focus point 216 is positioned at the center of fiber 118(b) so that the maximum amount of light is then reflected from storage media 128.

While travelling through optical switch 116, beam 210 passes through a beam splitter 214. Beam splitter 214 directs a percentage of the light from beam 210 to a position sensitive device 230. Position sensitive device 230 indirectly senses the position of focus point 216, and then sends the position of focus point 216 to servo control 142 (FIG. 1). Various embodiments of position sensitive device 230 are well known in the art.

Servo control 142 (FIG. 1) controls the movement of beam positioner 212 by selecting set points that are the desired x- and y-positions of focus point 216. Servo control 142 selects set points that correspond to a position on a selected fiber in fiber bundle 118, typically the center of the selected fiber. Servo control 142 also responds to information from position sensitive device 230 by selecting set points so that the position of focus point 216 is maintained in the presence of shock or vibration. If a shock or vibration causes focus point 216 to shift, position sensitive device 230 detects this shift, and sends the new position information to servo control 142 through pathway 140. Servo control 142 then changes its set points, which adjusts the position of beam positioner 212, which, in turn, adjusts the position of focus point 216. Focus point 216 is thus returned to its desired position, the center of fiber 118(b).

Position sensitive device 230, in conjunction with servo control 142, performs one embodiment of an indirect position correction technique. This indirect position correction technique senses the position of focus point 216 in relation to an x-y coordinate system. In FIG. 2, position sensitive device 230 senses the position of focus point 216 indirectly by receiving a portion of light from beam 210 before beam 210 arrives at fiber 118(b). Position sensitive device 230 indirectly senses the x- and y-coordinates of focus point 216, but does not directly sense the actual position of focus point 216 on fiber 118(b).

Position sensitive device 230 is physically separate from fiber bundle 118. Since position sensitive device 230 and fiber bundle 118 are rigidly disposed in optical switch 116, external shocks or vibrations cause negligible displacement between position sensitive device 230 and fiber bundle 118. However, external shocks and vibrations cause relative motion between beam positioner 212 and the other components of optical switch 116. Thus, focus point 216 moves relative to fiber bundle 118, which causes a position error. If a shock or vibration causes focus point 216 to move relative to fiber bundle 118, position sensitive device 230, in conjunction with servo control 142, is able to detect and correct the resulting position error.

Indirect position correction techniques are effective at correcting position errors due to shock and vibration. However, other factors may cause offsets in the desired position of focus point 216 on fiber 118(b). For example, thermal expansion of fiber bundle 118 may cause displacement in the location of fiber 118(b). A displacement in the location of fiber 118(b) causes focus point 216 to be offset from the center of fiber 118(b), which decreases coupling efficiency in optical switch 116. An indirect position correction technique is not able to detect this type of offset because fiber 118(b) is moving, not focus point 216. Thus an indirect position correction technique alone cannot maximize coupling efficiency in optical switch 116.

Direct position correction techniques may also be used to detect and correct the position of focus point 216. Direct position correction techniques sense the position where focus point 216 actually contacts fiber 118(b). One embodiment of a direct position correction technique senses the position of focus point 216 by measuring coupling efficiency, which is the amount of light reflected back through fiber 118(b) from storage media 128. A direct position correction technique senses the position of focus point 216 on fiber 118(b), instead of the position of focus point 216 in relation to an x-y coordinate system.

Direct position correction techniques may sometimes be used to detect and correct position errors due to shock and vibration. Embodiments of direct position correction techniques used for detection and correction of position errors due to shock and vibration typically require a substantial amount of light to be diverted from beam 210, which reduces the amount of light being sent to storage media 128. A direct position correction technique that requires a substantial amount of light to be diverted from beam 210 is typically unacceptable for efficient performance of MO drive 110.

However, since direct position correction techniques sense the position of focus point 216 on fiber 118(b) directly, these techniques detect offsets due to motion of fiber 118(b) caused by factors such as thermal expansion. Even though direct position correction techniques are able to detect and correct position errors and offsets due to almost any cause, detecting and correcting position errors due to shock and vibration require direct position correction techniques to measure coupling efficiency at a high sampling rate. A high sampling rate typically requires more processing resources than is acceptable for efficient performance of MO drive 110.

The system and method of the present invention utilizes an indirect position correction technique in conjunction with a direct position correction technique to maximize coupling efficiency in optical switch 116. An indirect position correction technique (for example position sensitive device 230 in conjunction with servo control 142) detects and corrects position errors due to shock and vibration. In addition, a direct position correction technique detects offsets in the position of focus point 216 on fiber 118(b) due to motion of fiber 118(b) caused by factors such as thermal expansion. The direct position correction technique of the present invention then determines an offset correction that is sent to servo control 142 to correct the position of focus point 216.

Offsets in the position of focus point 216 on fiber 118(b) due to motion of fiber 118(b) typically occur over a period of time. The direct position correction technique of the present invention measures coupling efficiency at a low sampling rate. The low sampling rate allows the direct position correction technique to make a measurement with a low signal to noise ratio and then average the measurement over a period of time to produce an offset correction with a high signal to noise ratio. Thus the direct position correction technique of the present invention does not require a high sampling rate, and does not require any light to be diverted from beam 210, which is acceptable for efficient performance of MO drive 110. One embodiment of the direct position correction technique of the present invention, alignment module 330, is discussed below in conjunction with FIGS. 3–9.

Figure 3:
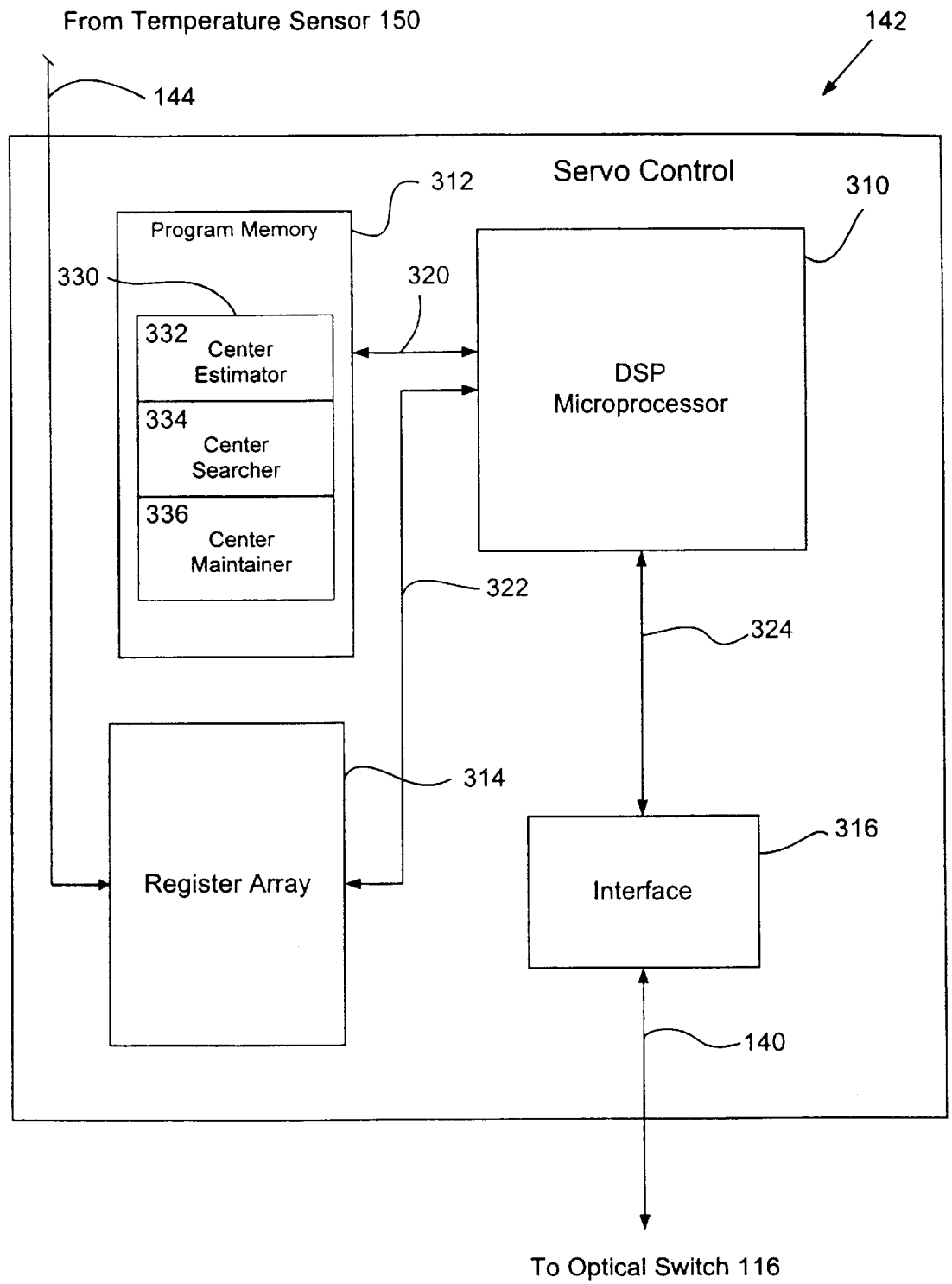
FIG. 3 is a block diagram of one embodiment of the servo control of FIG. 1, according to the present invention.

Referring now to FIG. 3, a block diagram of one embodiment of the FIG. 1 servo control 142 is shown. It is to be recognized that other embodiments may contain elements different than or in addition to the ones discussed here.

In the FIG. 3 embodiment, servo control 142 comprises a digital signal processing microprocessor 310, a program memory 312, a register array 314, and an interface 316. Digital signal processing (DSP) microprocessor 310 is a processor dedicated to the system and method of the present invention. DSP microprocessor 310 controls an alignment module 330, to be discussed below in reference to FIGS. 4–9. Program memory 312 stores alignment module 330, which includes a center estimator 332, a center searcher 334, and a center maintainer 336.

Register array 314 stores values for variables used by the alignment module. These variables are discussed below in reference to FIGS. 4–9. Interface 316 translates signals that travel between DSP microprocessor 310 and optical switch 116 through pathway 140. These signals control the movement of beam positioner 212, which in turn controls the position of focus point 216.

Figure 4:
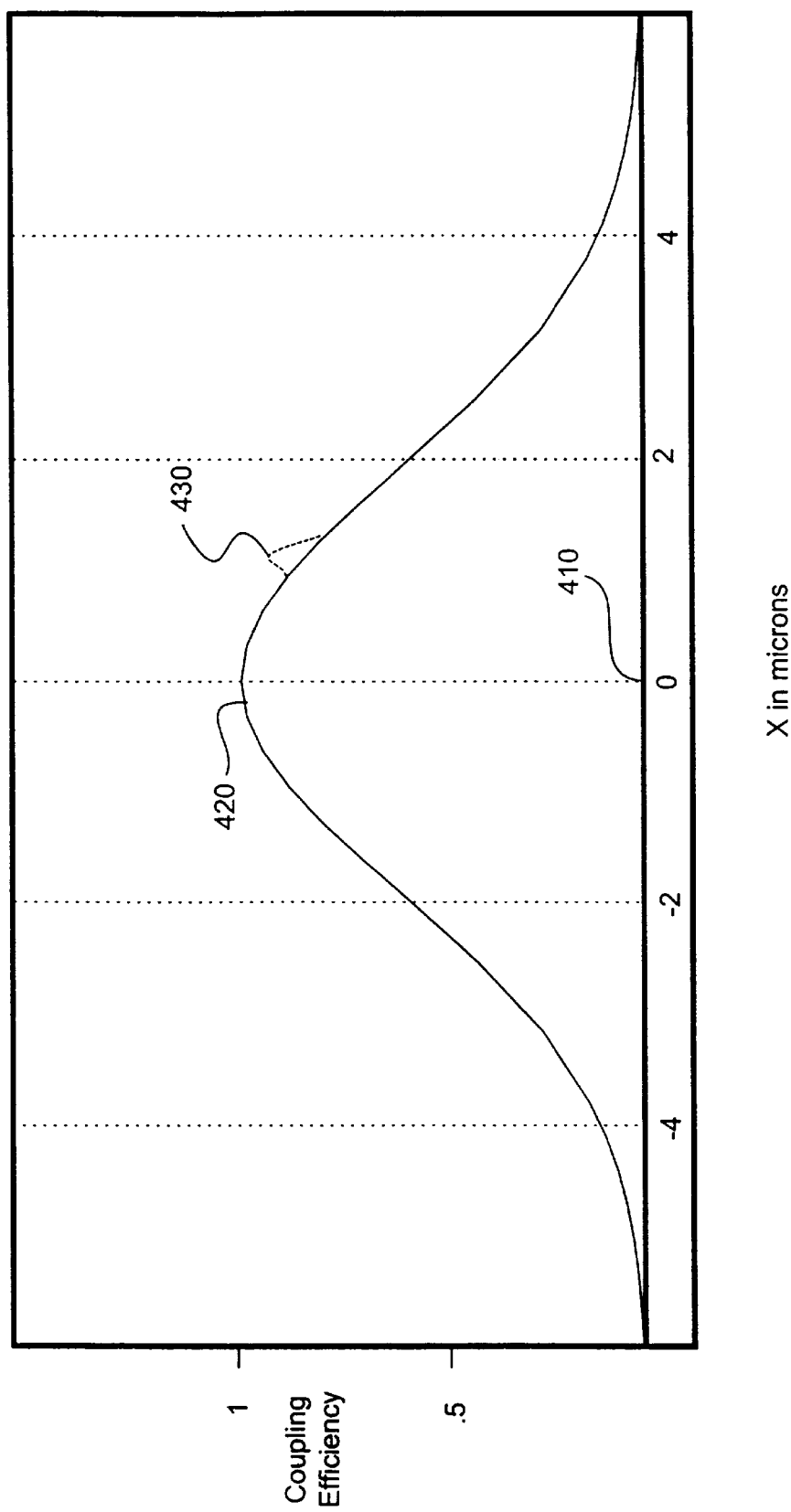
FIG. 4 is a curve representing coupling efficiency as a function of light beam position for an optical switch.

Referring now to FIG. 4, a curve representing coupling efficiency as a function of light beam position "x" for an optical switch is shown. The x-axis represents the position of focus point 216 on the face of optical fiber 118(b) in the x-direction. Origin 410 represents the geometrical center of the cross-section of the fiber—the fiber center. A similar curve results from plotting coupling efficiency as a function of light beam position in the y-direction.

As shown in FIG. 4, coupling efficiency reaches a global maximum 420 at origin 410, that is, when focus point 216 is positioned at the fiber center. Coupling efficiency decreases in an approximately Gaussian fashion as focus point 216 moves away from the fiber center. The curve may not be smooth due to imperfections in the optical components. Local peaks may be present, for example local maximum 430.

The preferred embodiment of the present invention utilizes this relationship between position of focus point 216 and coupling efficiency. Alignment module 330 (FIG. 3) directly measures the amount of light reflected back through a fiber from storage media 128, and uses that information to accurately align focus point 216 with the fiber center. Alignment module 330 identifies a direction of increasing coupling efficiency, then moves focus point 216 in that direction until it is positioned where coupling efficiency is maximized, on the fiber center. Thus the system and method of the present invention implements efficient coupling between optical elements.

Alignment module 330 of the present invention includes three main components. First, center estimator 332 determines initial set points, or an estimate position, for the center of a selected fiber. Second, center searcher 334 moves focus point 216 to the estimate position, then uses the relationship between position and coupling efficiency to move focus point 216 to the fiber center. Finally, center maintainer 336 maintains focus point 216 on the fiber center for as long as the same fiber in fiber bundle 118 is selected.

Experimentation has established that the position of the fibers in fiber bundle 118 shifts with a change in temperature in the optical system. The position of every fiber in fiber bundle 118 is offset by the same amount in the same direction at a given temperature. There is an approximately linear relationship between temperature and the position offset of a fiber in fiber bundle 118. This relationship is preferably determined during the manufacturing process of optical switch 116. The position of the fibers in fiber bundle 118 is determined at several temperatures. This information is used to calculate a linear scale factor, $\alpha$. The linear scale factor is the change in position divided by the change in temperature.

However, change in temperature may not be the only cause of offset. Thus, a system and method for efficient coupling between optical elements cannot be based solely on this relationship. Adjusting the position of focus point 216 based on position offset due to change in temperature may not result in focus point 216 being positioned on the fiber center. However, this adjustment positions focus point 216 on the selected fiber sufficiently close to the fiber center that a measurable quantity of light is reflected back through the fiber. Thus, adjusting the position of focus point 216 based on position offset due to change in temperature results in an acceptable estimate position of the fiber center.

The first component of alignment module 330, center estimator 332, determines an estimate position for the center of a fiber in fiber bundle 118. The estimate position is determined by adjusting the position of focus point 216 by a position adjustment due to a change in temperature. The position adjustment $(x_i, y_i)$ is calculated by selecting a temperature, $T_0$, and the offset in position of a fiber at that temperature, $(x_0, y_0)$, which was determined during the manufacturing process. These values, along with linear scale factor $\alpha$, are stored in program memory 312 of servo control 142. The current temperature of the optical system, T, is measured by temperature sensor 150 and stored in register array 314. Center estimator 332 then calculates the position adjustment as follows:

$x_i = x_0 + \alpha(T - T_0)$ $y_i = y_0 + \alpha(T - T_0)$.

Center estimator 332 then uses the position adjustment to adjust the position of focus point 216, resulting in the estimate position for the center of a fiber in fiber bundle 118. The same position adjustment values are used to adjust the position of focus point 216 for each fiber in fiber bundle 118.

Figure 5:
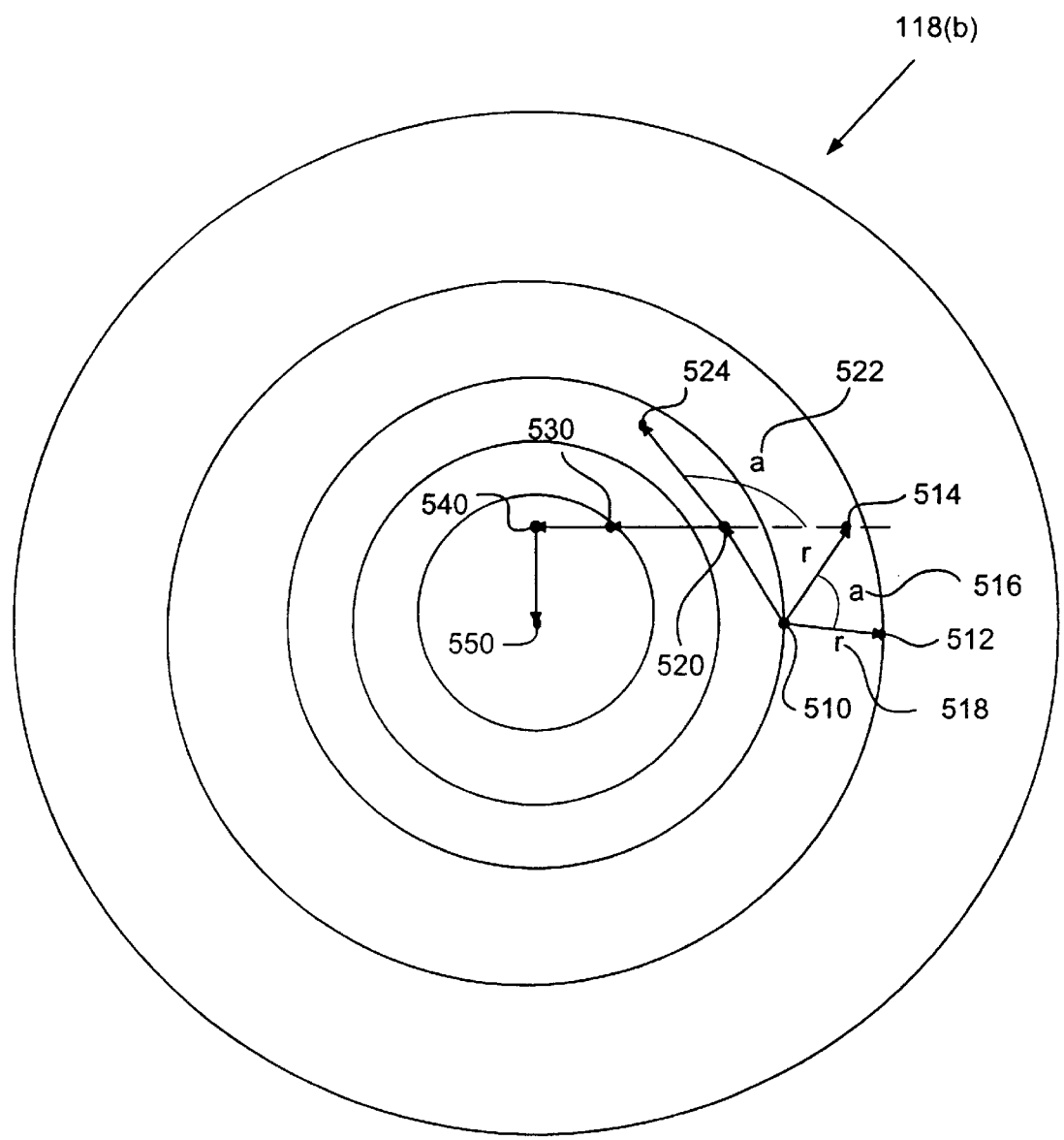
FIG. 5 is a conceptualized view of a cross-section of an optical fiber in an optical switch, according to the present invention.

Referring now to FIG. 5, a conceptualized view of a cross-section of optical fiber 118(b) in optical switch 116 is shown. It is to be understood that FIG. 5 is not intended to represent the actual appearance of a cross-section of optical fiber 118(b), but is only an illustration to facilitate the description of the present invention.

The second component of alignment module 330, center searcher 334, begins as servo control 142 sends a signal to switch 116 to move focus point 216 to estimate position 510. As shown in FIG. 5, estimate position 510 is typically not positioned at fiber center 550. However, in center searcher 334, estimate position 510 is defined as the hypothetical center of the fiber, $(x_c, y_c)$. Center searcher 334 adjusts the position of the hypothetical center until it is located at the actual fiber center.

When focus point 216 is moved to estimate position 510, center searcher 334 measures the amplitude of the light reflected back through fiber 118(b) at the hypothetical center, $P_c$, and stores this value in register array 314. Center searcher 334 then moves focus point 216 to position 512, the current search position. An angle 516 and a radius 518 determine the coordinates of position 512, (x, y). Angle (a) 516 is initially set equal to zero degrees, and this value is stored in register array 314 of servo control 142. Radius (r) 518 is initially set equal to a predetermined minimum radius, $r_0$, and this value is also stored in register array 314. In the preferred embodiment the minimum radius is approximately half a micron. Center searcher 334 then determines the coordinates of current search position 512 as follows:

$x = x_c + r \cos a$ $y = y_c + r \sin a$

When focus point 216 is moved to position 512, center searcher 334 measures the amplitude of reflected light generated at the current search position, P, and stores this value in register array 314. Center searcher 334 then compares the values of P and $P_c$. In the FIG. 5 example, position 512 is farther from the fiber center than estimate position 510, so the value of $P_c$ will be greater than P. The hypothetical center is therefore not redefined as position 512, but remains defined as estimate position 510.

Center searcher 334 now moves focus point 216 to the next search position, position 514. Position 514 is determined by increasing angle 516 and recalculating the values of x and y using the foregoing equations. Angle 516 is increased by a predetermined angle increment that is stored in program memory 312. In the preferred embodiment, the predetermined angle increment is forty-five degrees. The amplitude of reflected light, P, is measured at position 514 and compared to $P_c$. Once again, in the FIG. 5 example, $P_c$ will be greater than P, so the hypothetical center is not redefined as position 514.

Center searcher 334 continues in this fashion, measuring the amplitude of reflected light at points around a circle of radius r centered at the hypothetical center, until an increase in light amplitude is detected. In FIG. 5, such an increase is found at position 520. Center searcher 334 now redefines the hypothetical center as position 520, and continues to search for a further increase in light amplitude, as described above.

Once the hypothetical center has been redefined, center searcher 334 determines the coordinates of the next search position using the same angle and radius used to locate the previous search position. In other words, when center searcher 334 detects a direction of increasing light amplitude, center searcher 334 continues to seek a further increase in light amplitude along that same direction. Thus, in the FIG. 5 example, center searcher 334 moves focus point 216 to position 524. As center searcher 334 proceeds, the hypothetical center is subsequently redefined as position 530, then position 540, and finally as position 550, the actual fiber center.

During the execution of center searcher 334, a hypothetical center may be found with a corresponding light amplitude that appears to be a maximum. This may result when a complete search circle of radius r has been completed for the hypothetical center without detecting an increase in light amplitude. This position may be the fiber center, or a local maximum. As discussed in regards to FIG. 4, there may be areas on the fiber that have local light amplitude maximums. A search around a hypothetical center located on such a local maximum will not detect any increase in light amplitude for a small radius. Therefore, once an apparent fiber center has been found, center searcher 334 increases the search radius and moves focus point 216 around a larger search circle. If no increase in light amplitude is detected, the search radius is increased until it reaches a predetermined maximum value, $r_{max}$. When a search circle of radius $r_{max}$ is completed without an increase in light amplitude being detected, alignment module 330 identifies the hypothetical center as the fiber center.

Figure 6:
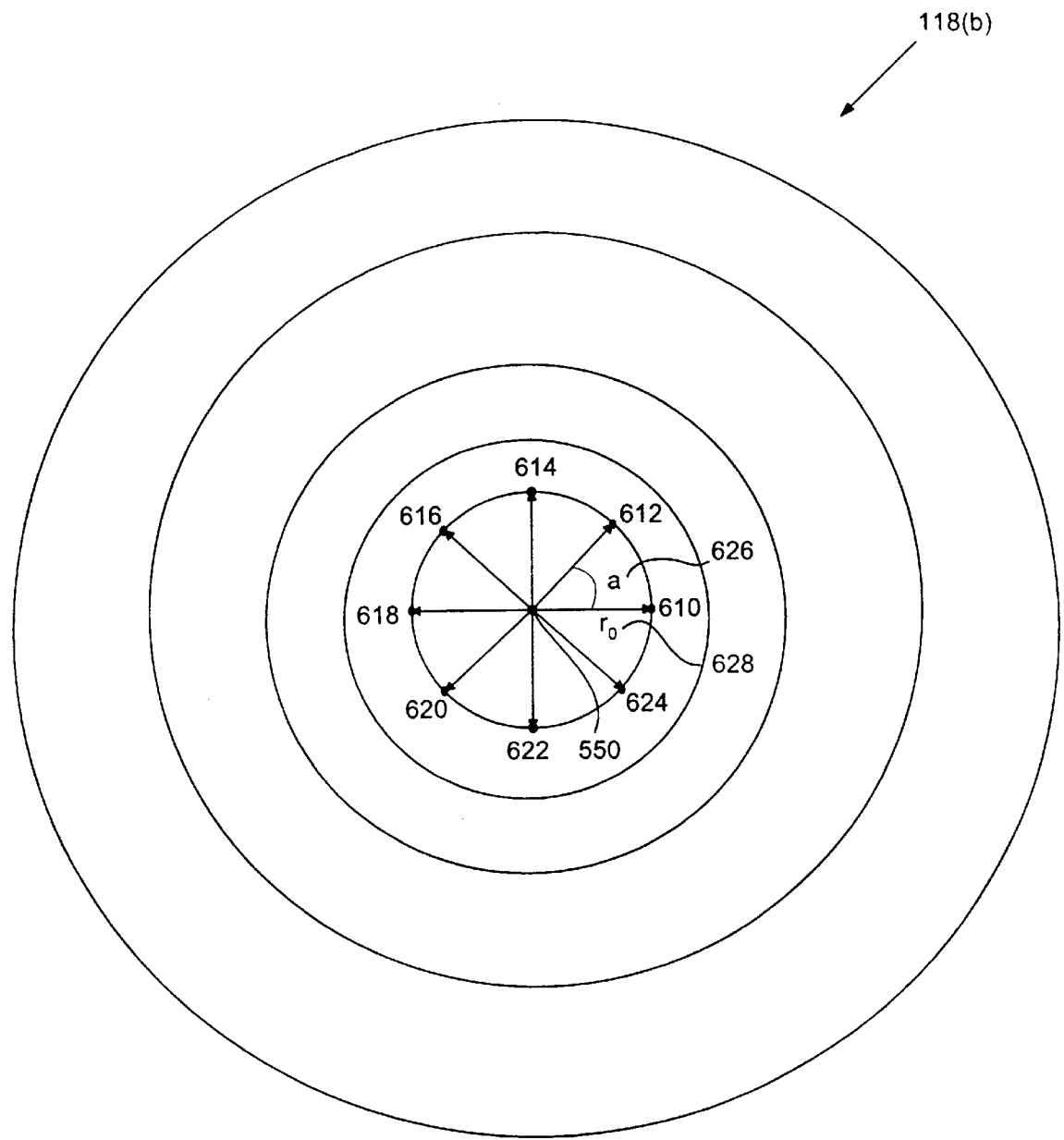
FIG. 6 is another conceptualized view of a cross-section of an optical fiber in an optical switch, according to the present invention.

Referring now to FIG. 6, another conceptualized view of a cross-section of optical fiber 118(b) in optical switch 116 is shown. Once center searcher 334 moves focus point 216 to the fiber center, center maintainer 336 begins executing. Center maintainer 336 continuously assesses coupling efficiency because further temperature or other changes may occur, causing the fiber to shift. Thus the fiber center will also shift and focus point 216 must be readjusted to maintain maximum coupling efficiency.

Center maintainer 336 functions similarly to center searcher 334. Center maintainer 336 moves focus point 216 to fiber center 550. In one embodiment, center maintainer 336 measures the amplitude of reflected light at the fiber center, $P_c$, and then stores the value of $P_c$ in register array 314. Next, center maintainer 336 determines the x- and y-coordinates of position 610 with the above center searcher equations, using an angle (a) 626 and a radius (r) 628. Angle 626 is initially set equal to zero degrees, and radius 628 is set equal to $r_0$, the predetermined initial radius used by center searcher 334. These values are stored in register array 314. Center maintainer 336 then moves focus point 216 to position 610.

When focus point 216 is at position 610, center maintainer 336 measures the amplitude of reflected light at that position, P, and stores it in register array 314. Center maintainer 336 then compares the values of P and $P_c$. If the value of P is greater than the value of $P_c$, center maintainer 336 identifies position 610 as the fiber center and begins the process again. If the value of P is less than the value of $P_c$, center maintainer 336 continues the current process.

Center maintainer 336 continues by moving focus point 216 back to fiber center 550 and measuring $P_c$ again. Center maintainer 336 increases angle 626 by a predetermined angle increment, and uses angle 626 and radius 628 to determine the coordinates of position 612. Center maintainer 336 then moves focus point 216 to position 612 and measures the amplitude of reflected light, P. Center maintainer 336 compares the values of P and $P_c$, and redefines the fiber center if an increase is found. Thus focus point 216 alternates between the fiber center and the circumference of a circle of radius $r_0$, the fiber center being redefined when a position is found that results in a greater amplitude of reflected light.

Center maintainer 336 continues executing while the same fiber in fiber bundle 118 is selected. If a different fiber is selected, alignment module 330 positions the beam on this fiber in the same manner discussed above in conjunction with FIG. 5, beginning with an estimate position determined by center estimator 332 using the position adjustment calculated for the initially selected fiber.

Figure 7:
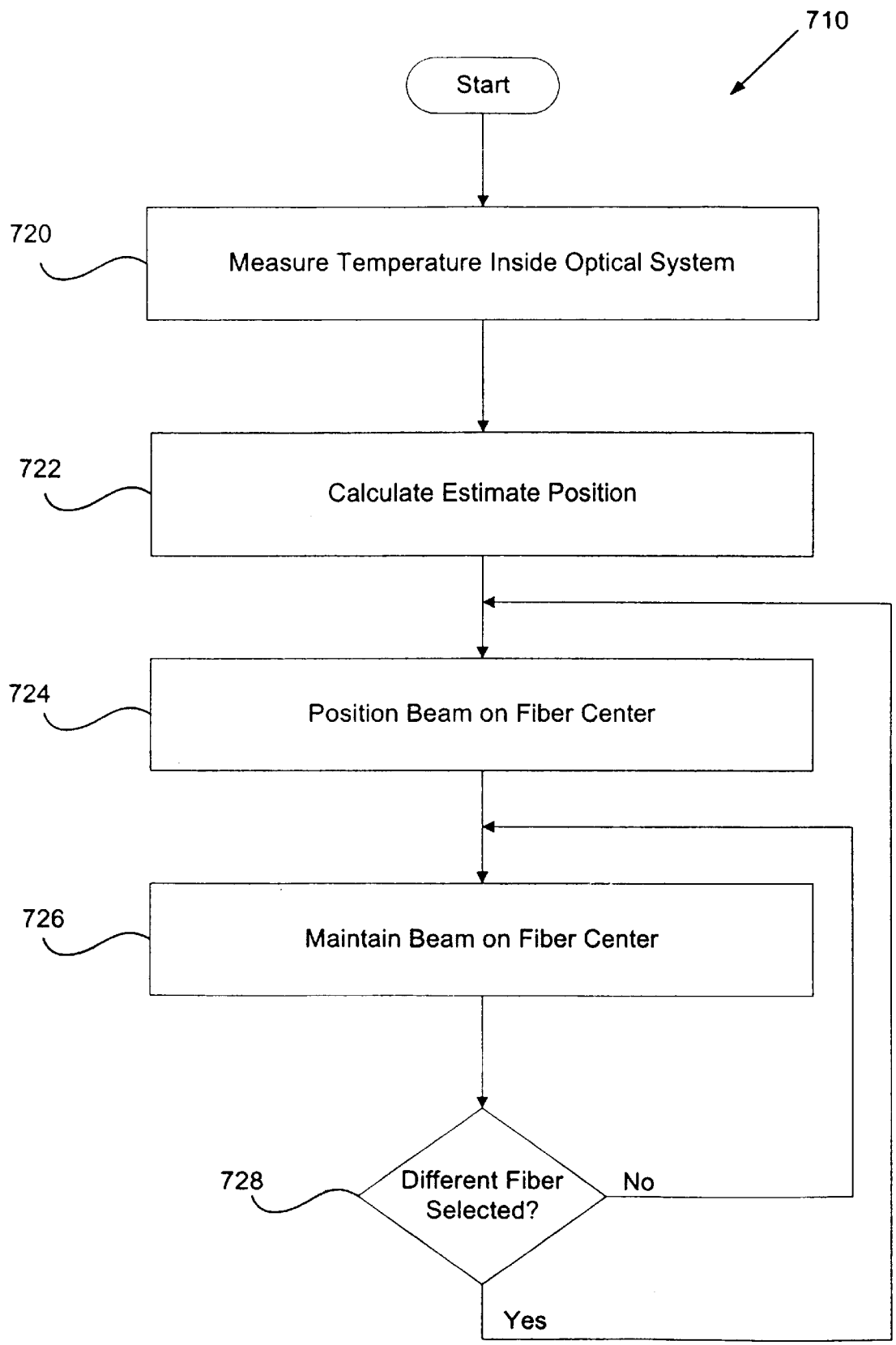
FIG. 7 is a flowchart of one embodiment of method steps to position a light beam on an optical fiber in a fiber bundle to maximize coupling efficiency, according to the present invention.

Referring now to FIG. 7, a flowchart 710 of one embodiment of method steps to position a light beam on an optical fiber in a fiber bundle to maximize coupling efficiency is shown, according to the present invention. A table of position offset versus temperature for fiber bundle 118 (FIG. 1) is created at the time of manufacture of the optical system, as described above in conjunction with FIG. 4. This table yields a linear scale factor, α. A table temperature, $T_0$, and its associated position offset are selected to illustrate the FIG. 7 method, however any other temperature from the table, with its associated position offset, may be used.

Initially, in step 720, temperature sensor 150 measures the current temperature, T, inside the optical system. In step 722, center estimator 332 determines an estimate position for fiber center 550 of a selected fiber based on offset due to change in temperature. Using the current temperature, the linear scale factor α, and table temperature $T_0$ and its associated position offset, center estimator 332 calculates a position adjustment using the equations described above in conjunction with FIG. 4. Center estimator 332 then uses the position adjustment to change the position of beam 210, resulting in the estimate position for fiber center 550 of the selected fiber.

Next, in step 724, center searcher 334 positions beam 210 on fiber center 550 of the selected fiber, as discussed below in conjunction with FIG. 8. In step 726, center maintainer 336 maintains beam 210 on fiber center 550, as discussed below in conjunction with FIG. 9. In step 728, alignment module 330 determines whether optical switch 116 (FIG. 1) has selected a different fiber. If optical switch 116 has not selected a different fiber, center maintainer 336 continues to maintain beam 210 on fiber center 550 of the selected fiber, in step 726. If optical switch 116 has selected a different fiber, the FIG. 7 method returns to step 724, where center searcher 334 begins positioning beam 210 on the center of the different fiber. In this way, the FIG. 7 method achieves and maintains coupling efficiency between optical elements.

Figure 8:
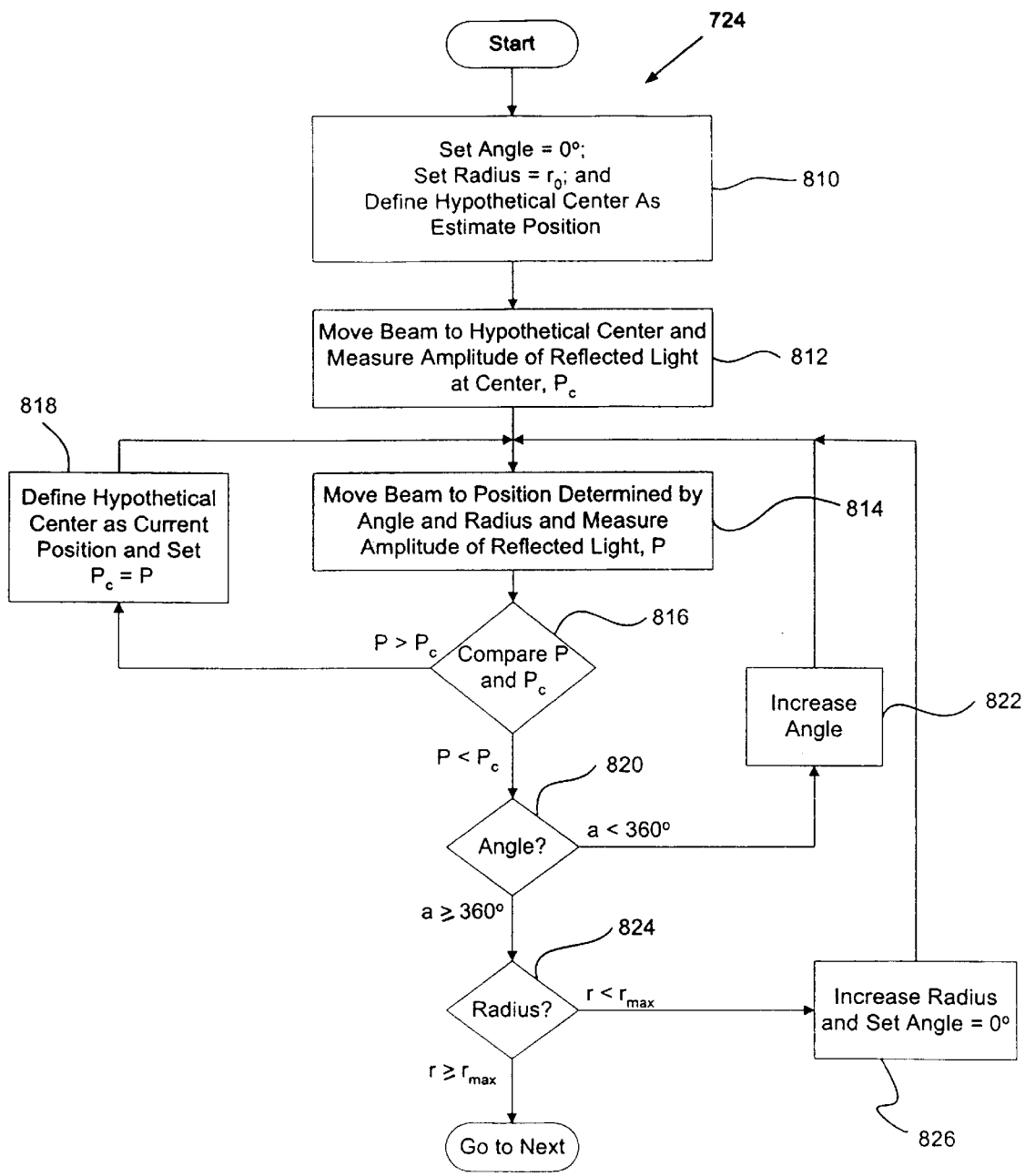
FIG. 8 is a flowchart of one embodiment of a subset of the method steps of FIG. 7, according to the present invention.

Referring now to FIG. 8, a flowchart of one embodiment of a subset of the method steps of FIG. 7 is shown. FIG. 8 illustrates one embodiment of step 724 of FIG. 7. In step 810, center searcher 334 sets angle 516 (FIG. 5) equal to zero, radius 518 (FIG. 5) equal to initial search radius $r_0$, and defines a hypothetical center of the fiber as the estimate position calculated in step 722 (FIG. 7). In step 812, center searcher 334 moves beam 210 to the hypothetical center and measures the amplitude of reflected light at center, $P_c$.

Next, in step 814, center searcher 334 moves beam 210 to a position determined by angle 516 and radius 518, using the equations described above in conjunction with FIG. 5. Center searcher 334 then measures the amplitude of reflected light, P. In step 816, center searcher 334 compares the values of $P_c$ and P. If the value of P is greater than the value of $P_c$, then, in step 818, center searcher 334 defines the hypothetical center as the current position of beam 210, and sets the amplitude of reflected light at the center, $P_c$, equal to P. The FIG. 8 method then returns to step 814.

If the value of P is less than the value of $P_c$, then, in step 820, center searcher 334 evaluates the value of angle 516. If angle 516 is less than 360°, then, in step 822, center searcher 334 increases angle 516 by a predetermined increment. The FIG. 8 method then returns to step 814.

If angle 516 is greater than or equal to 360°, then, in step 824, center searcher 334 evaluates the value of radius 518. If radius 518 is less than a predetermined maximum value, $r_{max}$, then, in step 826, center searcher 334 increases radius 518 by a predetermined increment and sets angle 516 equal to zero. The FIG. 8 method then returns to step 814. If radius 518 is greater than or equal to $r_{max}$ the FIG. 8 method proceeds to step 726 of FIG. 7. In this way, the FIG. 8 method positions beam 210 on fiber center 550.

Figure 9:
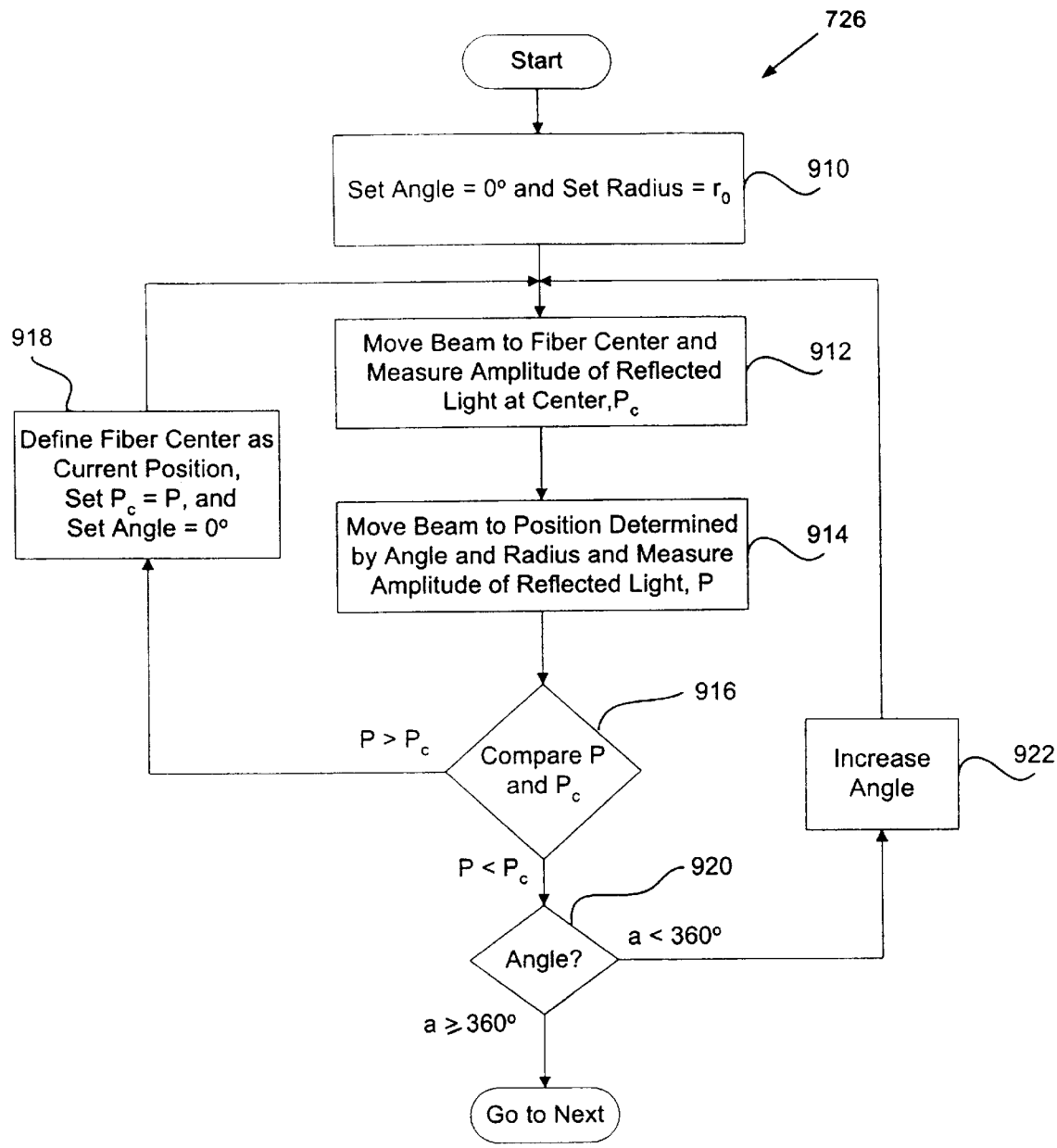
FIG. 9 is a flowchart of one embodiment of a subset of the method steps of FIG. 7, according to the present invention.

Referring now to FIG. 9, a flowchart of one embodiment of a subset of the method steps of FIG. 7 is shown. FIG. 9 illustrates one embodiment of step 726 of FIG. 7. In step 910, center maintainer 336 sets angle 626 (FIG. 6) equal to zero and radius 628 (FIG. 6) equal to initial search radius $r_0$. In step 912, center maintainer 336 moves beam 210 to the fiber center determined in step 724 (FIG. 7), and measures the amplitude of reflected light at center, $P_c$. In step 914, center maintainer 336 moves beam 210 to the position determined by angle 626 and radius 628, using the equations described above in conjunction with FIG. 5. Center maintainer 336 then measures the amplitude of reflected light, P.

In step 916, center maintainer 336 compares the values of P and $P_c$. If the value of P is greater than the value of $P_c$, then, in step 918, center maintainer 336 defines the fiber center as the current position of beam 210, sets the value of $P_c$ equal to P, and sets angle 626 equal to zero. The FIG. 9 method then returns to step 912.

If the value of P is less than the value of $P_c$, then, in step 920, center maintainer 336 evaluates the value of angle 626. If the value of angle 626 is less than 360°, then, in step 922, center maintainer 336 increases angle 626 by a predetermined increment, and the FIG. 9 method returns to step 912. If the value of angle 626 is greater than or equal to 360°, the FIG. 9 method proceeds to step 728 of FIG. 7. In this way, the FIG. 9 method maintains beam 210 on fiber center 550.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An optical apparatus for coupling laser light having an amplitude into an optical element having an end face comprising a beam positioner adapted to direct the laser light on to the end face of the optical element at a focus point so as to couple the laser light into the optical element, a light detector configured to sense light reflected back out of the optical element and a controller coupled to the light detector for measuring the amplitude of the reflected light during operation of the apparatus so as to detect any periodic misalignment between the beam positioner and the optical element, the controller being coupled to the beam positioner so that the focus point can be moved to a position on the end face of the optical element at which an increased amount of laser light is coupled into the optical element during subsequent operation of the apparatus.

2. The apparatus of claim 1 wherein the beam positioner is a movable lens.

3. The apparatus of claim 1 wherein the beam positioner is a movable mirror.

4. The apparatus of claim 3 wherein the movable mirror is a pivotable mirror.

5. The apparatus of claim 1, wherein said optical element comprises an optical fiber.

6. The apparatus of claim 5 wherein said controller has an alignment module comprising a center estimator configured to determine an estimate position of a fiber center of said optical fiber, a center searcher configured to position said laser light on said estimate position, locate said fiber center and position said laser light on said fiber center and a center maintainer configured to maintain said laser light on said fiber center.

7. The apparatus of claim 6 wherein said center estimator includes means for determining said estimate position by using an offset in position of said fiber center corresponding to a temperature change in said apparatus.

8. The apparatus of claim 6 wherein said center searcher includes means for locating said fiber center by identifying a direction in which increasing amounts of laser light are coupled into said optical fiber and moving said laser light along said direction until said laser light is positioned on said fiber center.

9. The apparatus of claim 8 wherein said center searcher includes means for identifying said direction in which increasing amounts of laser light are coupled into said optical fiber by measuring the amplitude of the reflected light at a hypothetical fiber center, measuring the amplitude of the reflected light at a search position and comparing said amplitude of reflected light at said hypothetical fiber center with said amplitude of reflected light at said search position.

10. The apparatus of claim 6 wherein said center maintainer includes means for maintaining said laser light on said fiber center by continuously assessing the laser light coupled into said optical fiber and repositioning said laser light if an increase in the laser light coupled into said optical fiber is detected.

11. The apparatus of claim 10 wherein said center maintainer includes means for assessing the amount of laser light coupled into said optical fiber by measuring the amplitude of the reflected light at said fiber center, measuring the amplitude of the reflected light at a search position and comparing said amplitude of reflected light at said fiber center with said amplitude of reflected light at said search position.

12. A method for coupling laser light having an amplitude into an optical element having an end face during operation of an optical system comprising the steps of directing the laser light on to the end face of the optical element at a focus point so as to couple the laser light into the optical element, periodically measuring the amplitude of light reflected back out of the optical element so as to detect any misalignment between the laser light and the optical element and moving the focus point of the laser light on the end face to a position at which an increased amount of laser light is coupled into the optical element during subsequent operation of the optical system.

13. The method of claim 12 wherein the measuring step includes the steps of measuring the amplitude of the light reflected back out of the optical element at a low sampling rate to produce a plurality of measurements and averaging the plurality of measurements to provide a correction to the focus point with a high signal to noise ratio.

14. The method of claim 12 further comprising the steps of directing the laser light on to an end face of an additional optical element at a focus point so as to couple the laser light into the additional optical element during operation of the optical system, periodically measuring the amplitude of the light reflected back out of the additional optical element and moving the focus point of the laser light on the end face of the additional optical element to a position at which an increased amount of laser light is coupled into the additional optical element during subsequent operation of the optical system.

15. The method of claim 12 wherein said optical element comprises an optical fiber.

16. The method of claim 15 further comprising the steps of determining an estimate position of a fiber center of said optical fiber, positioning said laser light on said estimate position, locating said fiber center, positioning said laser light on said fiber center and maintaining said laser light on said fiber center.

17. The method of claim 16 wherein said determining step includes the step of determining said estimate position by using an offset in position of said fiber center due to a temperature change in the vicinity of said optical fiber.

18. The method of claim 16 wherein said locating step includes the steps of locating said fiber center by identifying a direction in which increasing amounts of laser light are coupled into said optical fiber and moving said laser light along said direction until said laser light is positioned on said fiber center.

19. The method of claim 18 wherein said identifying step includes the steps of measuring the amplitude of reflected light at a hypothetical fiber center, measuring the amplitude of reflected light at a search position and comparing said amplitude of reflected light at said hypothetical fiber center with said amplitude of reflected light at said search position.

20. The method of claim 16 wherein said maintaining step includes the steps of continuously assessing the amount of laser light being coupled into said optical fiber at different locations on said end face and repositioning said laser light to one of said different locations if an increase in the amount of laser light being coupled into said optical fiber is detected at said one of said different locations.

21. The method of claim 20 wherein said assessing step includes the steps of measuring the amplitude of the reflected light at said fiber center, measuring the amplitude of the reflected light at a search position and comparing said amplitude of reflected light at said fiber center with said amplitude of reflected light at said search position.

22. A method for coupling laser light having an amplitude into an optical element having an end face comprising the steps of directing the laser light on to the end face of the optical element at a focus point so as to couple the laser light into the optical element, directing a portion of the laser light away from the end face, analyzing said portion of the laser light to indirectly sense the location of the focus point on the end face, measuring the amplitude of light reflected back out of the optical element and moving the focus point of the laser light on the end face to a position at which an increased amount of laser light is coupled into the optical element.

23. An optical apparatus for coupling signal-carrying laser light having a cross section into an optical element having an end face comprising a beam splitter for sampling the entire cross section of the laser light and directing a minor portion of the laser light away from the end face, a beam positioner adapted to direct a remaining portion of the laser light on to the end face of the optical element at a focus point so as to couple the laser light into the optical element, a position sensitive device configured to receive the minor portion of laser light so as to indirectly sense the position of the focus point on the end face and a controller coupled to the position sensitive device and to the beam positioner so that the focus point can be moved by the beam positioner in response to signals from the position sensitive device to a position on the end face of the optical element at which an increased amount of said remaining portion of the laser light is coupled into the optical element.

24. The apparatus of claim 23 wherein said optical element comprises an optical fiber.

25. The apparatus of claim 24 wherein said controller has an alignment module comprising a center estimator configured to determine an estimate position of a fiber center of said optical fiber, a center searcher configured to position said laser light on said estimate position, locate said fiber center and position said laser light on said fiber center and a center maintainer configured to maintain said laser light on said fiber center.

26. The apparatus of claim 25 wherein said center estimator includes means for determining said estimate position by using an offset in position of said fiber center corresponding to a temperature change in said apparatus.

27. The apparatus of claim 25 wherein said center searcher includes means for locating said fiber center by identifying a direction in which increasing amounts of said laser light are coupled into said optical fiber and moving said laser light along said direction until said laser light is positioned on said fiber center.

28. The apparatus of claim 27 wherein said center searcher includes means for identifying said direction in which increasing amounts of said laser light are coupled into said optical fiber by measuring the amplitude of light reflected at a hypothetical fiber center of said optical fiber, measuring the amplitude of the reflected light at a search position and comparing said amplitude of reflected light at said hypothetical fiber center with said amplitude of reflected light at said search position.

29. The apparatus of claim 25 wherein said center maintainer includes means for maintaining said laser light on said fiber center by continuously assessing said laser light being coupled into said optical fiber and repositioning said laser light if an increase in said laser light being coupled into said optical fiber is detected.

30. The apparatus of claim 29 wherein said center maintainer includes means for assessing the amount of said laser light being coupled into said optical fiber by measuring the amplitude of light reflected at said fiber center, measuring the amplitude of the reflected light at a search position and comparing said amplitude of reflected light at said fiber center with said amplitude of reflected light at said search position.

31. A method for coupling laser light having an amplitude into an optical element having an end face comprising the steps of directing a minor portion of the laser light away from the end face, directing a remaining portion of the laser light on to the end face of the optical element at a focus point so as to couple the remaining portion of the laser light into the optical element, analyzing the minor portion of the laser light so as to indirectly sense the location of the focus point on the end face, measuring the amplitude of the light reflected back out of the optical element at a plurality of search positions and at a low sampling rate to produce a plurality of coupling measurements, averaging the plurality of coupling measurements to obtain a correction with a high signal to noise ratio of the position on the end face at which an increased amount of laser light is coupled into the optical element and moving the focus point to the position on the end face.

32. The method of claim 31 wherein said optical element comprises an optical fiber.

33. The method of claim 32 further comprising the step of moving the focus point to a fiber center of said optical fiber in response to said analyzing step.

34. The method of claim 33 wherein said analyzing step includes the steps of determining an estimate position of a fiber center of said optical fiber and positioning said remaining portion of the laser light on said estimate position and wherein said averaging step includes the step of locating said fiber center.

35. The method of claim 34 wherein said determining step includes the step of determining said estimate position by using an offset in position of said fiber center due to a temperature change in the vicinity of said optical fiber.

36. The method of claim 34 wherein said locating step includes the steps of locating said fiber center by identifying a direction in which increasing amounts of said laser light are coupled into said optical fiber and moving said remaining portion of the light beam along said direction.

37. The method of claim 36 wherein said identifying step includes the steps of measuring the amplitude of reflected light at a hypothetical fiber center, measuring the amplitude of reflected light at a search position and comparing said amplitude of reflected light at said hypothetical fiber center with said amplitude of reflected light at said search position.

38. The method of claim 34 further comprising the steps of maintaining said laser light on said fiber center by continuously assessing the amount of said laser light being coupled into said optical fiber at nearby locations on the end face and repositioning said laser light if an increase in the amount of said laser light being coupled into the optical fiber at a nearby location is detected.

39. The method of claim 38 wherein said assessing step includes the steps of measuring the amplitude of the reflected light at said fiber center, measuring the amplitude of the reflected light at a search position and comparing said amplitude of reflected light at said fiber center with said amplitude of reflected light at said search position.

* * * * *